(12) United States Patent
Tatzel et al.

(10) Patent No.: US 8,508,681 B2
(45) Date of Patent: Aug. 13, 2013

(54) VARIABLE TRANSMISSION WINDOW

(75) Inventors: Ryan Tatzel, Syosset, NY (US);
William McLeod, Granger, IN (US)

(73) Assignee: SmarterShade, Inc., South Bend, IN (US)

( * ) Notice: Subject to any disclaimer, the term of this patent is extended or adjusted under 35 U.S.C. 154(b) by 60 days.

(21) Appl. No.: 13/339,764

(22) Filed: Dec. 29, 2011

(65) Prior Publication Data
US 2012/0169950 A1    Jul. 5, 2012

Related U.S. Application Data

(60) Provisional application No. 61/428,307, filed on Dec. 30, 2010.

(51) Int. Cl.
*G02F 1/1335* (2006.01)
(52) U.S. Cl.
USPC .............................. 349/18; 349/119
(58) Field of Classification Search
USPC ................................... 349/18, 119
See application file for complete search history.

(56) References Cited

U.S. PATENT DOCUMENTS

| | | | |
|---|---|---|---|
| 2,260,220 A | 10/1941 | Grabau |
| 2,280,358 A | 4/1942 | Tietig |
| 2,281,112 A | 4/1942 | Ryan |
| 2,302,507 A | 11/1942 | Ryan |
| 2,617,329 A | 11/1952 | Dreyer |
| 3,159,844 A | 12/1964 | Haboush |
| 3,443,855 A | 5/1969 | Land |
| 3,504,962 A | 4/1970 | Shanley |
| 3,521,300 A | 7/1970 | Weiss |
| 3,528,722 A | 9/1970 | Makas |
| 3,540,793 A | 11/1970 | Araugo et al. |
| 3,663,089 A | 5/1972 | Makas |
| 3,880,496 A | 4/1975 | Davidyan et al. |
| 4,070,096 A | 1/1978 | Jasgur |
| 4,123,141 A | 10/1978 | Schuler |
| 4,153,952 A | 5/1979 | Dussich |
| 4,285,577 A | 8/1981 | Schuler |
| 4,364,375 A | 12/1982 | Younghouse |

(Continued)

FOREIGN PATENT DOCUMENTS

EP        0182639 A2    5/1986

OTHER PUBLICATIONS

International Search Report & Written Opinion issued in PCT Application No. PCT/US2011/067754, mailed on Jul. 2, 2012.

(Continued)

*Primary Examiner* — Richard Kim
(74) *Attorney, Agent, or Firm* — The Marbury Law Group PLLC

(57) ABSTRACT

The various embodiments include variable optical transmission devices with uniform or patterned polarizers or wave retarders configured to provide continuous or nearly continuous variations in light transmission based on linear translation. For example, embodiments include a variable transmission window including a first uniform polarizer with a first polarization axis, a second uniform polarizer with a second polarization axis, a first patterned wave retarder positioned between the first and second polarizers and including a first plurality of domains configured to vary in at least one of optic axis, thickness, or birefringence, and a second patterned wave retarder positioned between the first and second polarizers and including a second plurality of domains configured to vary in at least one of optic axis, thickness, or birefringence. The first or second wave retarder is configured to be linearly translatable relative to the other wave retarder.

19 Claims, 17 Drawing Sheets

(56) References Cited

U.S. PATENT DOCUMENTS

| | | | |
|---|---|---|---|
| 4,509,825 A | 4/1985 | Otto et al. |
| 4,512,638 A | 4/1985 | Sriram et al. |
| 4,579,426 A | 4/1986 | Onufry |
| 4,719,720 A | 1/1988 | Olsen |
| 4,773,733 A | 9/1988 | Murphy, Jr. et al. |
| 4,902,112 A | 2/1990 | Lowe |
| 4,962,780 A | 10/1990 | Engdahl et al. |
| 5,033,829 A | 7/1991 | Faroughy |
| 5,164,856 A | 11/1992 | Zhang et al. |
| 5,189,552 A | 2/1993 | Metwalli |
| 5,841,581 A | 11/1998 | Tutt |
| 5,940,216 A | 8/1999 | Gibbs |
| 5,999,316 A | 12/1999 | Allen |
| 6,185,039 B1 | 2/2001 | Allen et al. |
| 6,368,760 B1 | 4/2002 | Nishiguchi |
| 6,414,790 B1 | 7/2002 | Bennett |
| 6,452,724 B1 | 9/2002 | Hansen |
| 6,710,921 B2 | 3/2004 | Hansen et al. |
| 6,878,425 B1 | 4/2005 | Gomes |
| 7,113,335 B2 | 9/2006 | Sales |
| 7,375,887 B2 | 5/2008 | Hansen et al. |
| 7,548,370 B2 | 6/2009 | Albert et al. |
| 7,630,132 B2 | 12/2009 | Sangu et al. |
| 2001/0040730 A1 | 11/2001 | Lee et al. |
| 2003/0142400 A1 | 7/2003 | Hansen et al. |
| 2004/0120041 A1 | 6/2004 | Silverstein et al. |
| 2006/0061862 A1 | 3/2006 | Mi et al. |
| 2006/0193046 A1 | 8/2006 | Yellin |
| 2006/0215263 A1 | 9/2006 | Mi et al. |
| 2006/0238867 A1 | 10/2006 | Tajeda et al. |
| 2006/0262398 A1 | 11/2006 | Sangu et al. |
| 2009/0190217 A1 | 7/2009 | Chen et al. |
| 2010/0053751 A1 | 3/2010 | McLeod et al. |

OTHER PUBLICATIONS

Chen et al., "Large Flexible Nanowire Grid Visible Polarizer Mad by Nanoimprint Lithograph," Applied Physics Letters, vol. 90, N6, Feb. 8, 2007, pp. 063111-1 to 063111-3.

Ahn et al., "Fabrication of a 50nm half-pitch Wire Grid Polarizer Using Nanoprint Lithography," 2005 Nanotechnology, vol. 16, N9, Jul. 22, 2005, pp. 1874-1877.

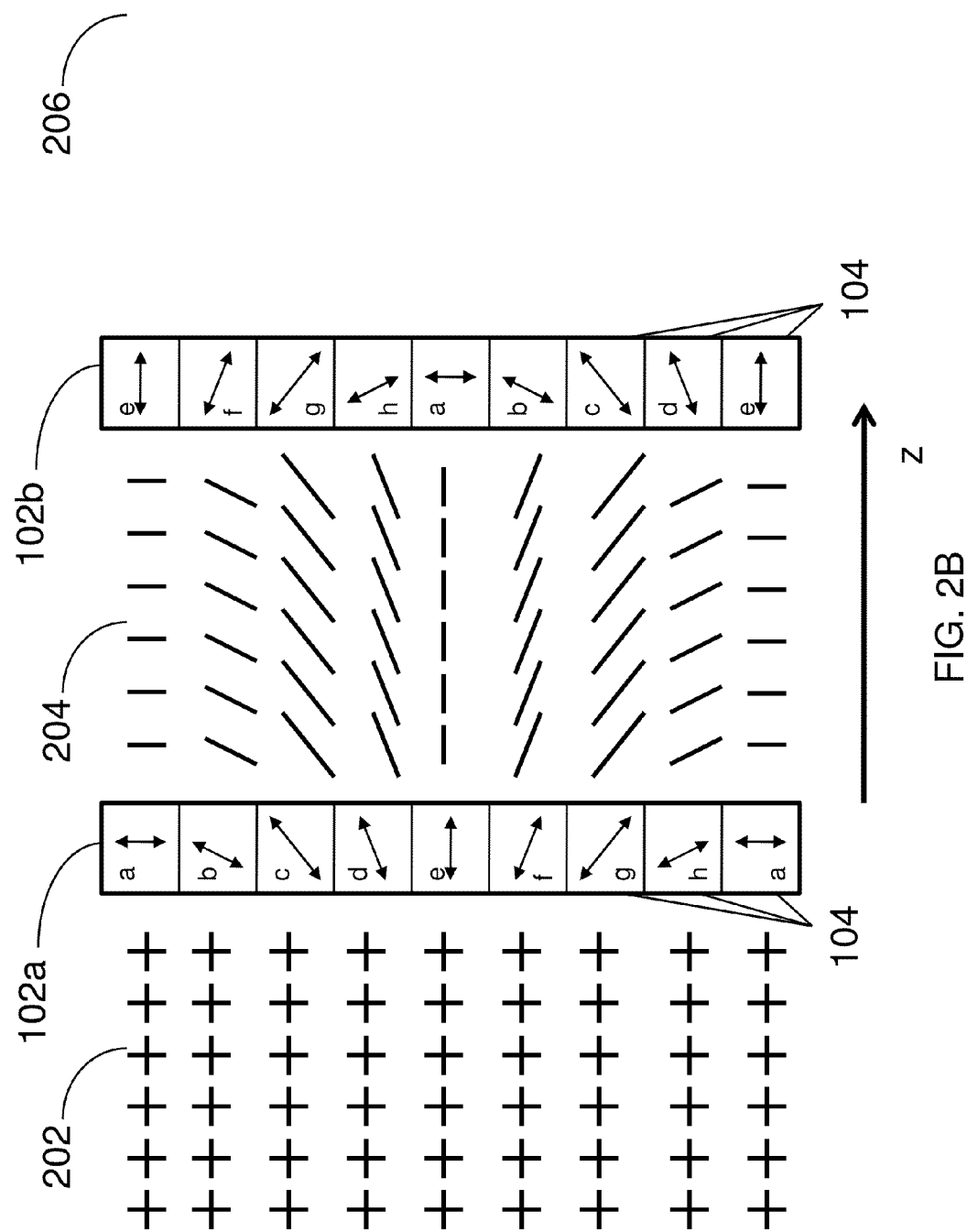

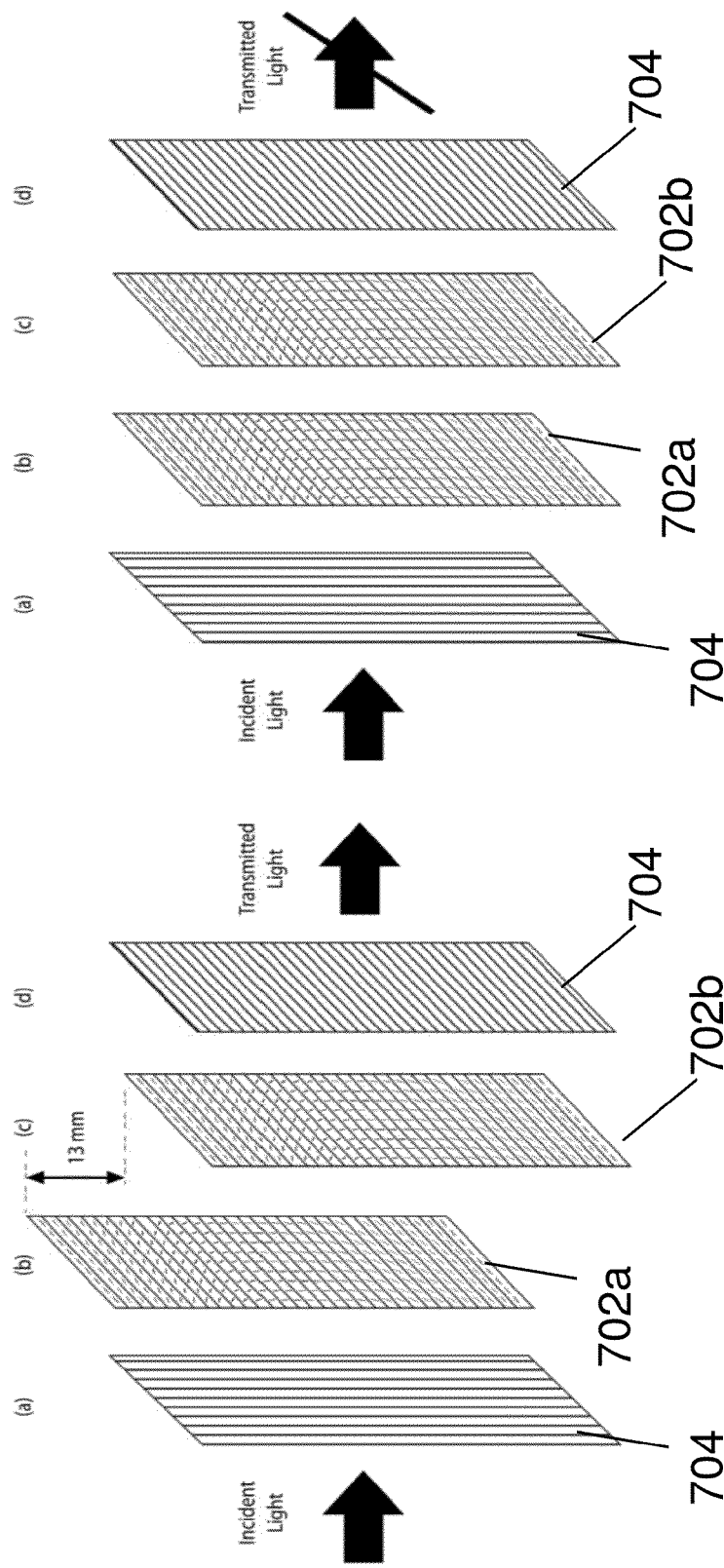

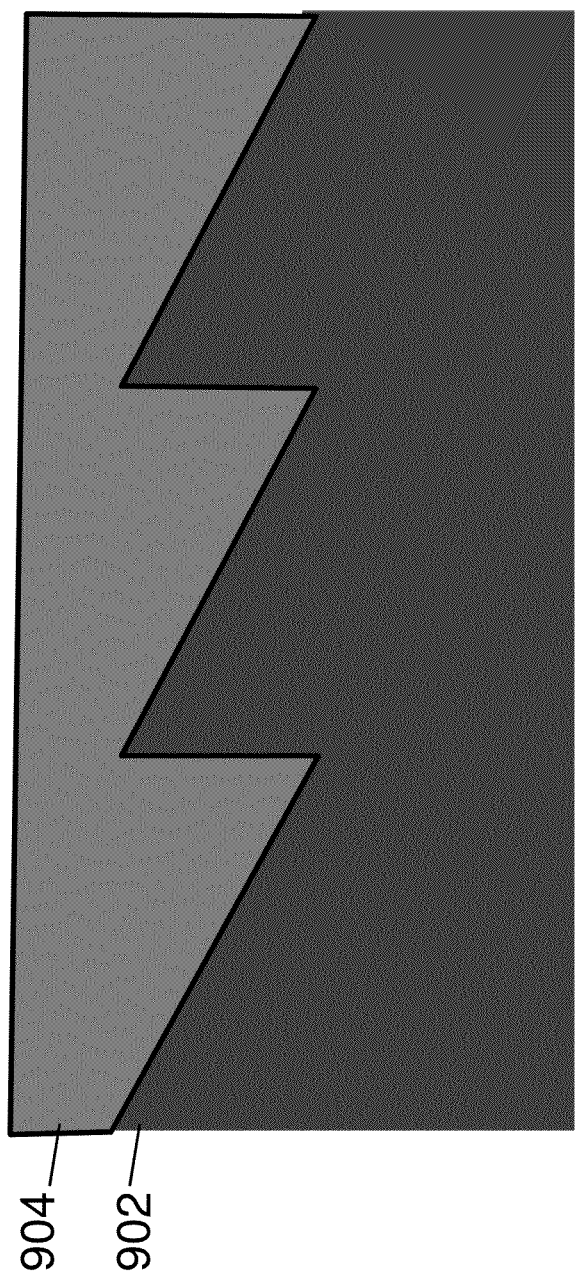

VARIABLE TRANSMISSION WINDOW

CROSS-REFERENCE TO RELATED APPLICATIONS

This application claims the benefit of priority to U.S. Provisional Patent Application Ser. No. 61/428,307 filed Dec. 30, 2010 which is hereby incorporated herein by reference in its entirety.

BACKGROUND

A polarizer is a device that transforms unpolarized or mixed polarization electromagnetic waves into polarized waves. Polarizers have found a wide array of practical applications such as in photographic filters, microscopes, optoelectronics, lasers, and liquid crystal displays. Wave plates or retarders are optical devices that can change the polarization of electromagnetic waves. Wave plates are often used to control the polarization of waves and therefore are involved in many of the same applications as polarizers. Many prior art devices rotate polarizers or wave plates relative to one another to vary the angle between polarization or optic axes. For example, polarization filters for photography may involve rotating a polarizer to vary the intensity of light transmission through the filter.

SUMMARY OF THE INVENTION

Various embodiments include a variable optical transmission device including a first uniform polarizer with a first polarization axis, a second uniform polarizer with a second polarization axis, a first patterned wave retarder positioned between the first and second polarizers and including a first plurality of domains configured to vary in at least one of optic axis, thickness, or birefringence, and a second patterned wave retarder positioned between the first and second polarizers and including a second plurality of domains configured to vary in at least one of optic axis, thickness, or birefringence, wherein the first or second wave retarder is configured to be linearly translatable relative to the other wave retarder.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

FIG. 2A is a diagram of an embodiment device for a variable transmission window comprising two patterned linear polarizer aligned to allow light through.

FIG. 2B is a diagram of an embodiment device for a variable transmission window comprising two patterned linear polarizer aligned to not allow light through.

FIG. 2C is a diagram of an embodiment device for a variable transmission window comprising two patterned linear polarizer aligned to allow only some light through.

FIG. 4A is a diagram of an embodiment device for a variable transmission window comprising two uniform polarizers and two patterned wave plates with the wave plates aligned so that light passes through.

FIG. 4B is a diagram of an embodiment device for a variable transmission window comprising two uniform polarizers and two patterned wave plates with the wave plates aligned so that light does not pass through.

FIG. 4C is a diagram of an embodiment device for a variable transmission window comprising two uniform polarizers and two patterned wave plates with the wave plates aligned so that only some light passes through.

FIGS. 7D and 7E are diagrams illustrating a linear translation in a patterned wave retarder to shift the amount of transmitted light.

FIG. 9 is a schematic of a saw tooth substrate used for producing variable thickness wave plate suitable for use in various embodiments.

DETAILED DESCRIPTION OF THE PREFERRED EMBODIMENTS

Figure 1A:
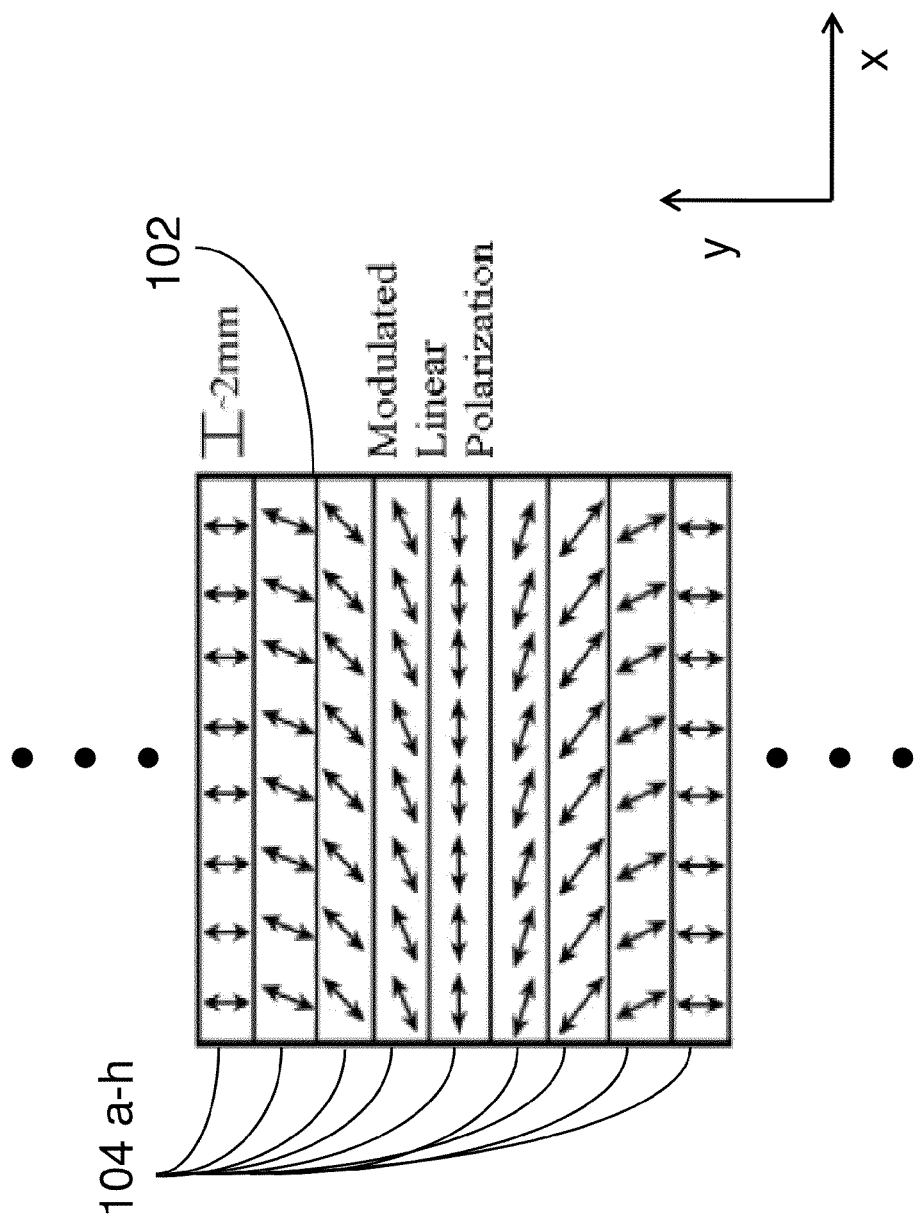
FIG. 1A is a diagram of the polarization axes in a patterned linear polarizer that may be used in various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "plurality" is used herein to mean two or more. For example, a plurality may refer to three or more or various ranges, such as 2-200, 4-200, or 70-180.

The various embodiments include variable light transmission devices configured to provide continuous or nearly continuous variations in light transmission. Alternatively, the devices may switch between discreet states, such as an "on" transmissive state and a lower transmission "off" or dark state where the light transmission is below 5%, such as 1% or less. These devices may be used in many different applications, such as windows or shades in buildings, vehicles, or any other place where regulating light, glare, or heat would be useful. Various embodiments take advantage of polarization and wave retarder theory. For example, embodiments may include two or more uniform or patterned light polarizers or wave retarders configured to be linearly translated with respect to each other. Further embodiments may include uniform or patterned polarizers or wave retarders manufactured by any of the various methods disclosed herein. As used herein, the term "light" includes visible radiation (e.g., visible portion of the solar spectrum) as well as infra-red and/or ultra violet radiation (e.g., IR and UV portions of the solar spectrum).

Polarization Theory

An electromagnetic wave includes electric and magnetic field components which oscillate perpendicular to each other and to the direction of wave propagation. A beam of light may be described by its direction of propagation, frequency, and vector amplitude (e.g., electric field vector). The vector amplitude is related to the intensity of the beam and is perpendicular to the wave's direction of travel. Given a direction of wave propagation (e.g., z-axis), there are two independent mutually orthogonal transverse components, the ordinary ray and extraordinary ray (e.g., $E_x$ and $E_y$), of the electric field vector amplitude.

The plane containing the electric field vector and the direction of propagation is called the plane of polarization. Polarization is a property of waves that describes the orientation of their oscillations.

In unpolarized light, the electric field vectors are randomly oriented about the direction of propagation. Conversely, if the electric field vectors are oriented in the same direction for all waves, the light is regarded as plane polarized. A polarizer is an optical arrangement which produces a beam of polarized light from a beam of unpolarized light. Given a direction of propagation (e.g., z-axis), a polarizer decomposes the electric field vector of a beam of unpolarized light into two independent mutually orthogonal transverse components, the ordinary ray and extraordinary ray, (e.g., $E_x$ and $E_y$) and preferentially selects one and rejects the other. Depending on the type of polarizer this selection is accomplished by absorption, reflection, refraction, or scattering.

Malus's law gives the intensity (I) produced when a polarizer is placed in front of an incident beam.

$$I=I_0 \cos^2 \theta_i$$

where $I_0$ is the initial intensity and $\theta_i$ is the angle between the lights initial polarization direction and the axis of the polarizer.

A beam of unpolarized light can be thought of as containing a uniform mixture of linear polarizations at all possible angles. Since the integral over a full cycle of $\cos^2 \theta$ is ½, the intensity of light transmitted through a single polarizer is 50% of the initial intensity. In practice, some light is typically lost in the polarizer and the actual transmission of unpolarized light may be somewhat lower than this.

When two linear polarizers are placed one after another, the mutual angle between their polarizing axes gives the value of $\theta$ in Malus' law. The second polarizer is generally referred to as an analyzer. Therefore, when the polarization axes of the polarizer and analyzer are parallel the amount of light transmittance is maximized, and if the two axes are orthogonal the polarizers are crossed and in theory no light is transmitted. Furthermore, rotation of one polarizer with respect to the other will result in partial light blockage over the range of transmittances between that minimum and maximum in accordance with Malus's law.

Wave Retarder Theory

Another useful tool for manipulating the polarization of light is a wave retarder, also known as a wave plate. A wave plate or retarder is a birefringent material that alters the polarization state of a wave travelling through it (i.e., reorienting the polarization axis of the wave).

Birefringence, or double refraction, is the splitting of a beam of unpolarized light into two rays. Most optical materials are isotropic, i.e. having the same optical properties (and therefore one index of refraction) regardless of the direction of propagation through the material. In anisotropic materials either the separation between neighboring atomic structural units is different in different directions or the bonds tying such units together have different characteristics in different directions. As a result the velocity of a wave is a function of a displacement direction. Polarized light propagating through such materials will experience a different index of refraction for different directions of propagation and polarization orientations. This phenomenon is known as birefringence. Within the material there exists an optic axis with a unique optical property such that light propagating along it encounters only one index of refraction regardless of its polarization direction. Birefringent materials are either uniaxial or biaxial, depending upon whether they have one optic axis or two. Although uniaxial materials are discussed in the example embodiments below for the sake of simplicity, various embodiments may include birefringent materials with two or more optic axes.

For each propagation direction with linearly polarized electromagnetic waves, there are two principal displacement directions for which the velocity is different. These polarization directions are at right angles. When the plane of polarization of a light beam does not coincide with one of the two principal displacement directions, the light vector will be split into two components corresponding to the two directions. The ordinary ray is always polarized with its electric field vector perpendicular to the optic axis and encountering the ordinary refractive index ($n_o$) travels with the same speed in all directions obeying Snell's law of refraction. The extraordinary wave is always polarized with its electric field vector parallel to the alignment axis, encounters the extraordinary refractive index ($n_e$), does not propagate perpendicularly to its wavefronts, and in general does not obey Snell's law. The separation between the two rays depends upon the direction in which the light travels through the crystal relative to that of the optic axis of the crystal. Quantitatively, the birefringence value of a material is defined as ($n_e-n_o$).

If $n_e > n_o$ the velocity of propagation of the extraordinary wave is greater than that of the ordinary wave and birefringent material is said to be positive. The birefringent material is said to be negative if the reverse is true. Often the axis which propagates with the highest index value is called the slow axis.

Simply stated, a birefringent material resolves light into two components by causing one type of vibration to travel one path and the other type to travel another path at different velocities. Consequently the components emerge from the birefringent material differing in phase and the polarization state of the incident light is changed.

The resulting phase difference or retardance (F) for extraordinary and ordinary rays is given by the equation $$\Gamma=2\pi d(n_e-n_o)/\lambda$$

where d indicates the material thickness, $\lambda$ the wavelength, and $n_e$ and $n_o$ are the refraction indices of extraordinary and ordinary rays, respectively.

As discussed previously light does not transmit when the polarization axis of the polarizer and the polarization axis of the analyzer are orthogonal. However, inserting a wave plate between a polarizer and an analyzer changes the state of the polarized light and may cause the light to pass through. When the optic axis of a wave plate is placed between crossed polarizers at an angle of $\theta$ to the input polarizer's axis, the intensity of the injected light is expressed as $$I=I_0 \sin^2 2\theta \sin^2(\Gamma/2)$$

Therefore the amount of light transmitted is determined by both (1) the angle between the optic axis of the incoming polarizer and the optic axis of the wave plate and (2) the retardance. Moreover, the retardance is determined by the thickness of the birefringent material and the birefringence of the wave plate ($n_e - n_o$).

If the retardance corresponds to π radians (or 180°), then it is called a half-wave plate. A retardation of Γ=π will cause the polarization to rotate to twice the angle of the half wave plate's fast axis with the input polarization plane. The amount of light transmitted is determined by the angle between the optic axis of the incoming polarizer and half wave plate. Placing the half wave plate's optic axis at 45° to the incoming polarizer achieves a maximum transmission. Aligning the optic axis of the half wave plate with either of the input or output polarizers optic axes gives the minimum transmission. Furthermore, rotation of the optic axis of the half wave plate results in partial light blockage over the range of transmittances between that minimum and maximum in accordance with Malus's law.

Various embodiments may also include quarter-wave plates. Quarter-wave plates have a retardation of π/2 radians (or 90°) or quarter-wavelength phase shift and can change linearly polarized light into circularly polarized and back again.

It is also possible to vary the light transmission by adjusting the retardance. By aligning the fast axis of the variable retarder at a predetermined angle, such as at 45° or another suitable angle relative to the input polarizer, and modulating the retardance between half wave and full wave, transmission varies between maximum and minimum. This variation in retardance can be achieved by varying the thickness of the birefringent material or the birefringence of the film ($n_e - n_o$).

Variable Transmission Windows

The various embodiments include variable transmission windows adjustable through linearly translating a patterned polarizer or a patterned wave plate. The patterned polarizer or wave plate may move relative to another patterned polarizer or wave plate. In some embodiments, polarizers and wave plates may be joined together in panels to move together relative to other polarizers or wave plates. For example, some embodiments may include a first panel with a first uniform linear polarizer and a first wave plate physically coupled together that may linearly translate relative to a second panel with a second uniform linear polarizer physically coupled with a second wave plate. Alternatively, one or both wave plates may be unconnected to panels or polarizers.

Embodiments may include various types of polarizers. Some embodiments may incorporate uniform polarizers with a single uniform polarization axis. These polarizers may include iodine dyed polarizers, wire grid polarizers, coatable polarizers, reflective polarizers, or various absorptive polarizers. Alternate embodiments may include patterned polarizers with multiple polarization axes. For these embodiments with patterned polarizers, the wave retarders are not required.

FIG. 1A illustrates a patterned polarizer that may be used in various embodiments. The patterned polarizer 102 may be divided into several domains 104 with different polarization axes. The axes of the domains 104 in FIG. 1A are indicated by arrows. The polarization axis may be uniform within each domain but vary between adjacent domains. These polarization axes may be selected to gradually shift across adjacent domains 104 as shown in FIG. 1A. These domains 104 may continue and repeat as much as needed as indicated by the dots above and below the patterned polarizer 102. The patterned polarizer 102 may vary in size. Each domain 104 may be strip shaped and may be 1-10 mm, such as around 2 mm wide in some embodiments, but this width may vary.

Figure 1B:
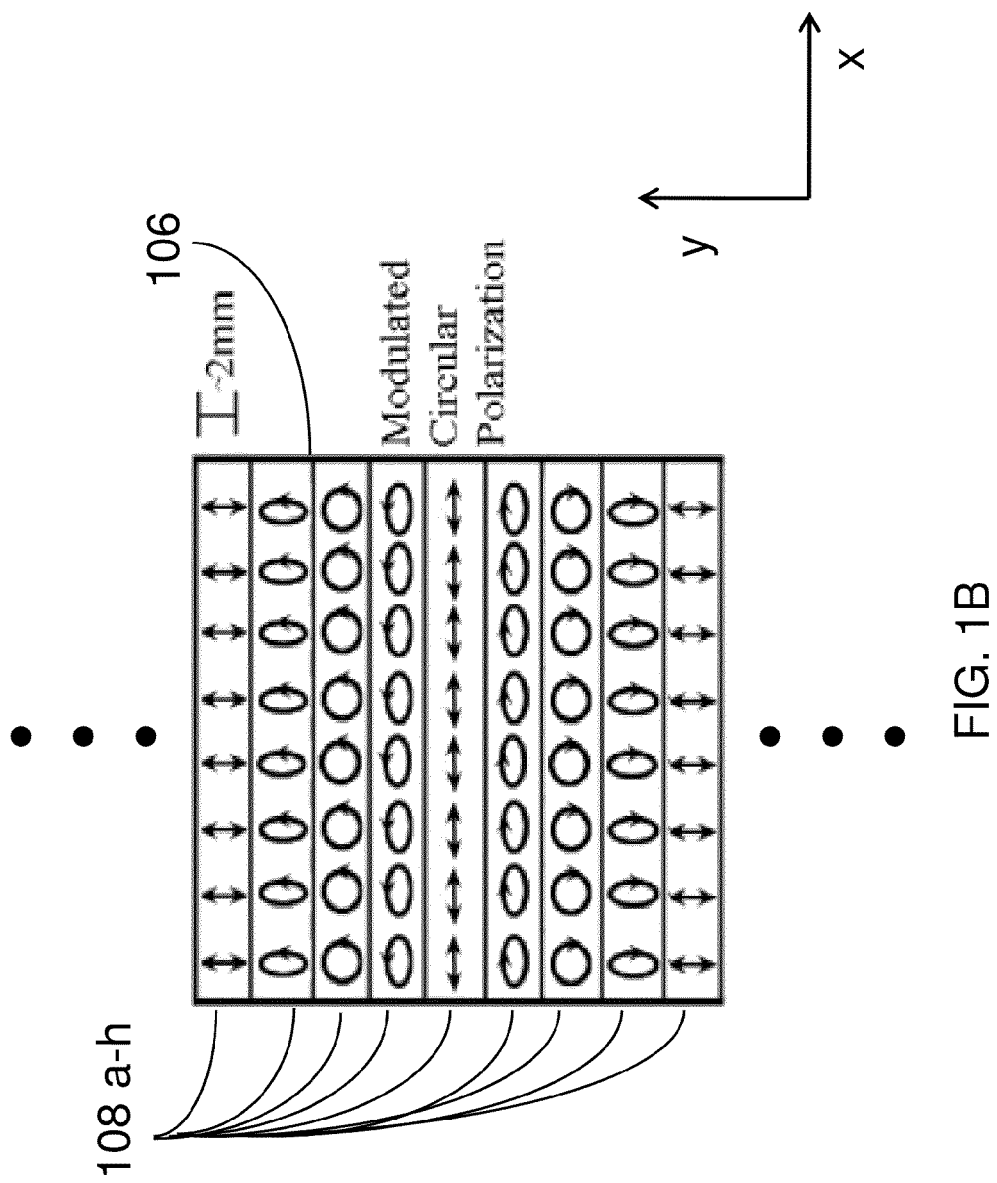
FIG. 1B is a diagram of the polarization axes in a patterned circular polarizer that may be used in various embodiments.

FIG. 1A illustrates a patterned linear polarizer. Alternatively, a patterned circular polarizer 106 may include circular polarization domains 108 as shown in FIG. 1B. Similar to the patterned linear polarizer 102, the patterned circular polarizer 106 may vary in size and include polarization axes that gradually shift across adjacent domains 108. The following examples are shown with linear polarizers for the sake of simplicity, but further embodiments may include patterned circular polarizers 106.

In various embodiments, the polarization axis of two linear polarizers may be patterned in such a way that linear displacement of one polarizer with respect to the other produces a continuous variation of light transmission similar to what occurs when two uniform linear polarizers are rotated with respect to each other. The translation of one patterned polarizer with respect to the other changes the mutual angle between their polarizing axes which gives the value of θ in Malus' law and therefore determines the light transmittance. The light transmittance may vary based on how the domains of patterned polarizers are aligned, which in turn may vary based on how much the polarizers are linearly translated relative to one another.

Figure 2A:
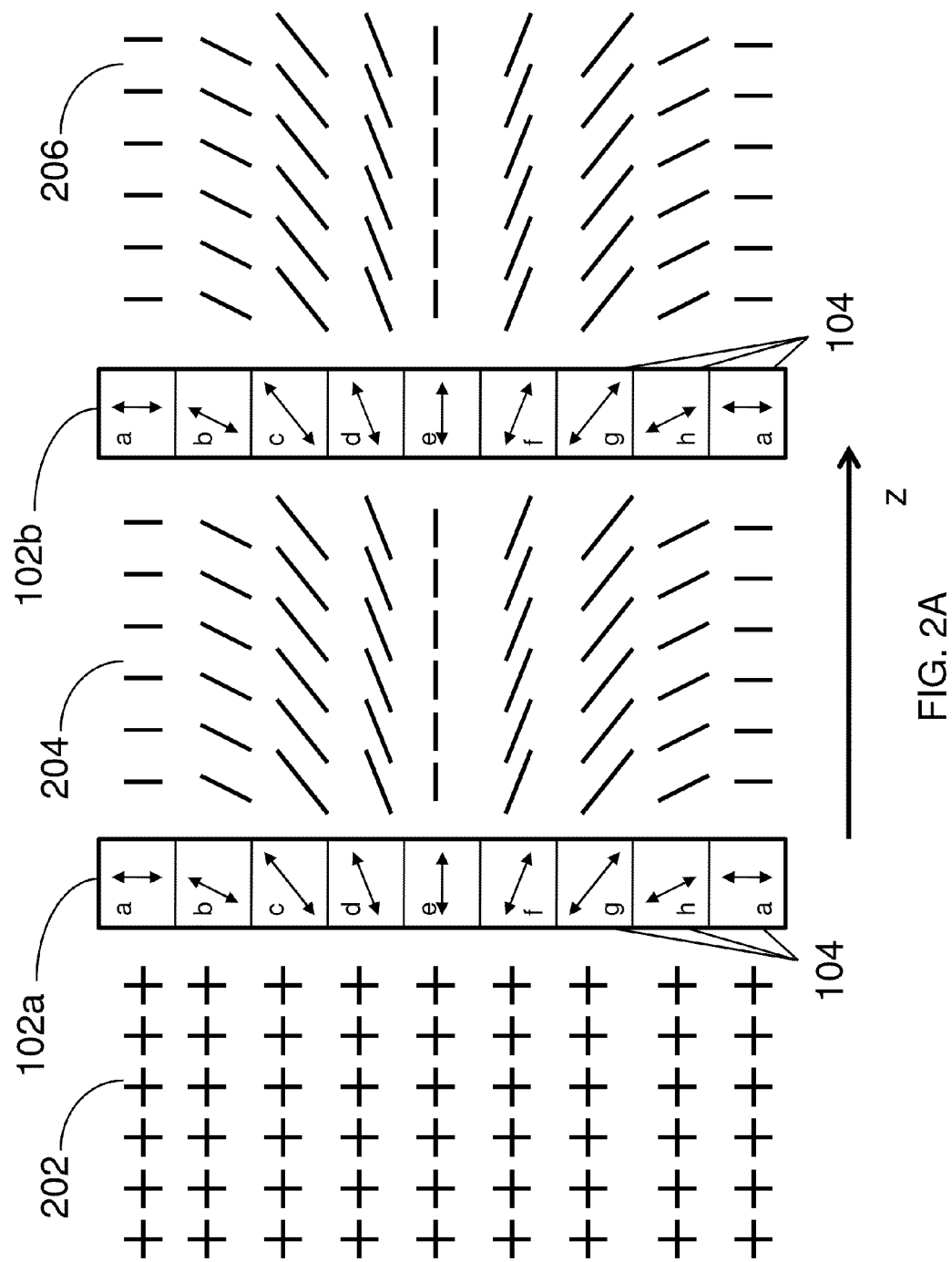

FIG. 2A illustrates an embodiment arrangement of two patterned linear polarizers 102a and 102b (the second polarizer 102b may also be called an analyzer as discussed above). The two patterned linear polarizers 102a and 102b include domains 104a-h with different polarization axes. Light may propagate in the z axis and pass through the polarizers from left to right along the z axis shown beneath. Light 202 may originally be unpolarized and contain components in the x and y axes. The plus signs of the original light 202 in FIG. 2A symbolize the x and y components for illustration only, but the light is actually moving in the z axis so these components would not be seen this way from this point of view. The light between the polarizers 204 and the light after both polarizers 206 are also represented in FIG. 2A by symbols for their x and y polarization orientations but may also move in the z axis.

The first patterned polarizer 102a may include polarization axes similar to the polarizer 102 in FIG. 1A. These axes are represented in the x and y axes as in FIG. 1A, but the polarizer 102A is rotated 90 degrees into the plane perpendicular to the z axis to allow light to travel through along the z axis. The second polarizer 102b may be similarly arranged. The domains 104a-h may repeat any number of times but only a single series is shown for simplicity. The series shown may change as a polarizer is shifted up or down as in FIGS. 2B and 2C.

As light 202 passes through the first polarizer 102a, the light may be polarized as components of the light 202 are blocked depending on the polarization axis of whichever domain the light passes through. The result may be variably polarized light 204. For example, the top domain shown in polarizer 102a (i.e., domain 104a) has a polarization orientation in the y axis and therefore blocks components in the x axis. Accordingly, the variably polarized light 204 following domain 104a of the polarizer is stripped of x components. The other domains 104b-h may block x and y components of incoming light 202 as well depending on each polarization axis. Thus, the variably polarized light 204 may vary according to the domains of the polarizer 102a. The overall intensity of the variably polarized light 204 may be around half or less than the original light as discussed above with regard to Malus's law and polarization.

The variably polarized light 204 may pass through the second polarizer 102b. In FIG. 2A, the second polarizer 102b is aligned such that each domain has the same polarization axis as the corresponding domains in the first polarizer 102a (e.g., domain 104a of the first polarizer 102a is aligned with domain 104a of the second polarizer 102b, domain 104b of the first polarizer 102a is aligned with domain 104b of the second polarizer 102b, etc.). Each level of the variably polarized light 204 may pass through a domain with the same polarization axis as passed though in the first polarizer 102a. Passing through a second polarizer with a parallel polarization axis may not block any additional light according to Malus's law. The final light 206 may therefore be the same (or almost the same) as the variably polarized light 204. This corresponds to the clear state of a variable optical transmission device.

FIG. 2B illustrates a similar embodiment as FIG. 2A except that the second polarizer 102b is linearly translated relative to the first polarizer 102a such that domains with orthogonal polarization axes are aligned. For example, the second polarizer may have been shifted up or down a distance of several domains widths (e.g., domain 104a of the first polarizer 102a is aligned with domain 104e of the second polarizer 102b, domain 104b of the first polarizer 102a is aligned with domain 104f of the second polarizer 102b, etc.). Each level of the variably polarized light 204 may strike a domain whose polarization axis is orthogonal to the polarization axis of the domain already passed through in the first polarizer 102a. The result may be that no light 206 (or nearly none) passes through the second polarizer. This corresponds to the dark state of a variable optical transmission device.

Figure 2C:
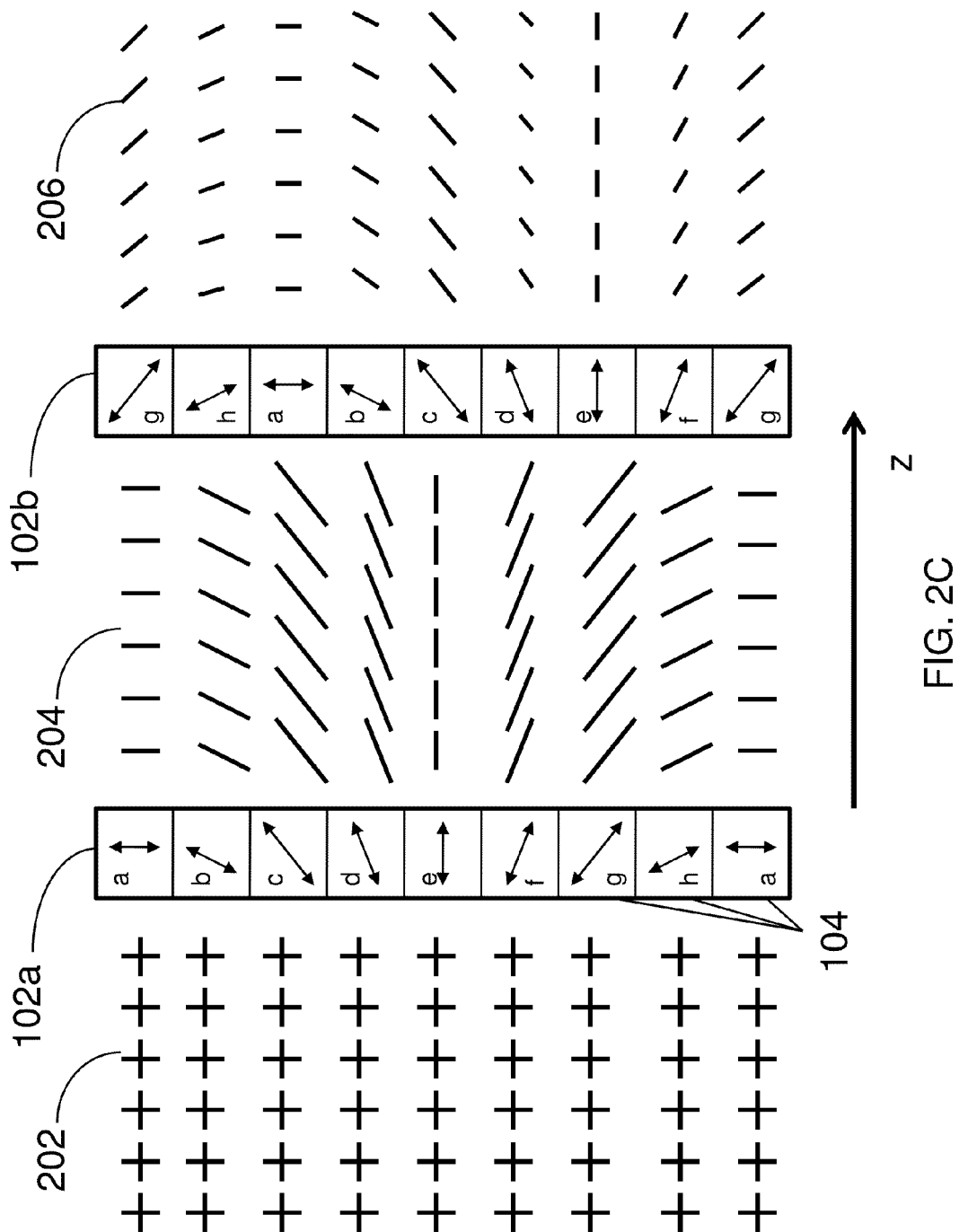

FIG. 2C illustrates another similar embodiment, except that the second polarizer 102b is linearly translated such that the corresponding domains of the first and second polarizers are neither parallel nor orthogonal. The result is that some light 206 passes through the second polarizer 102b. Therefore by linearly translating a polarizer (i.e. moving one of the polarizers up or down) the embodiment allows varying the intensity of light transmitted through the polarizers. Further, the light transmitted through may be continuously varied based on the amount of translation. The polarizers may be translated to various other intermediate positions relative to one another to continuously vary the intensity of light transmitted. This corresponds to the intermediate states of a variable optical transmission device.

Figure 3:
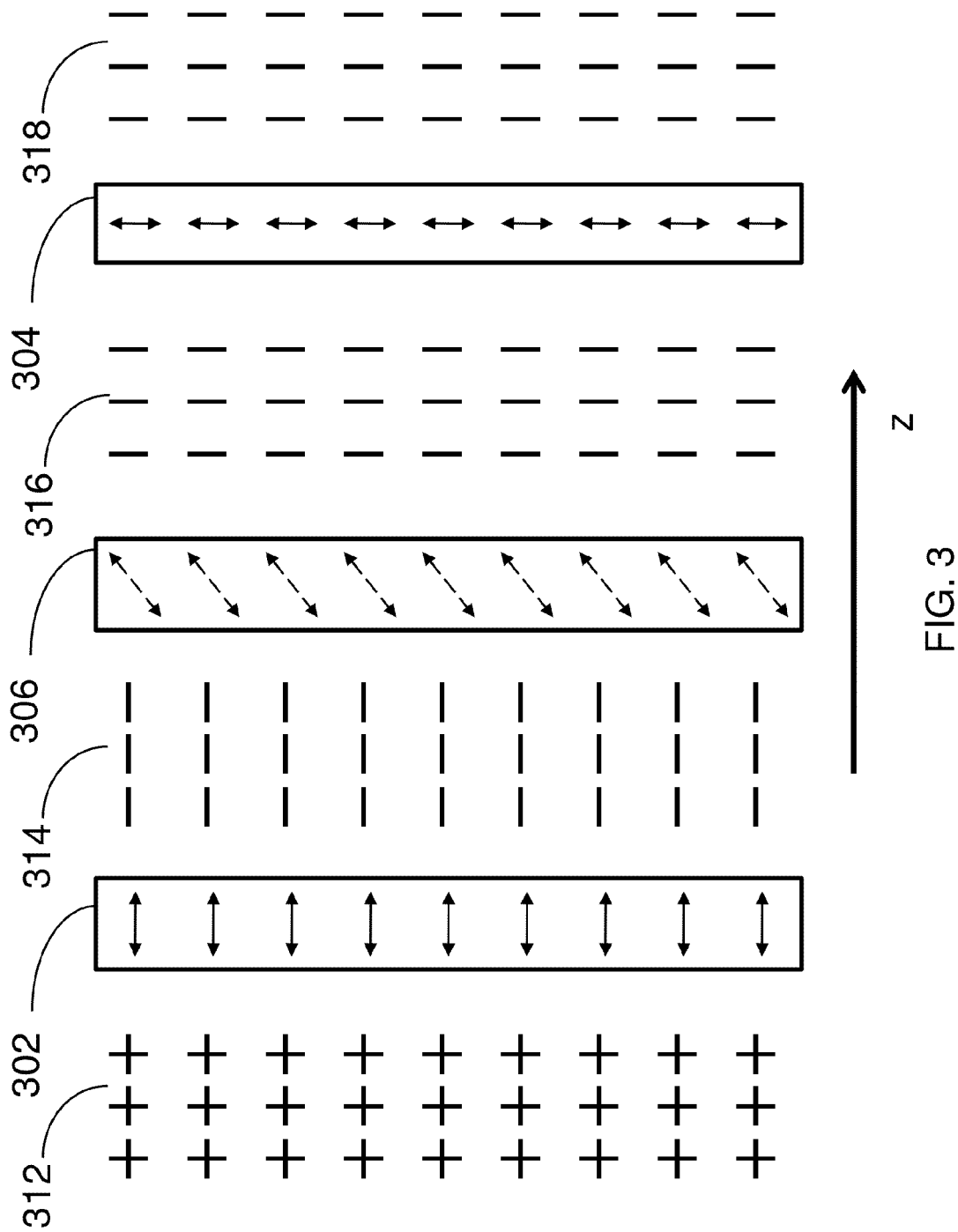
FIG. 3 is a diagram of two uniform polarizers with orthogonal polarization axes and a wave plate between the two polarizers to reorient light.

Alternate embodiments may involve wave retarders. FIG. 3 illustrates a wave retarder 306 between a first polarizer 302 and a second polarizer 304. Unlike the previous figures, the first and second polarizers may be uniform with a single polarization axis (indicated with a solid line with arrows on both ends) throughout the polarizer rather than patterned with domains of different polarization axes. If the polarization axis of the first polarizer is orthogonal to the polarization axis of the second polarizer, normally no light would pass through according to Malus's law. However, FIG. 3 illustrates that a wave retarder 306 may lead to a different result.

Unpolarized light 312, shown with symbols similar to light 202, may propagate through a first uniform polarizer 302. The result may be polarized light 314 in the y axis. Polarized light 314 may pass through a wave retarder 306. The wave retarder 306 may be made of birefringent material and therefore retard light depending on the orientation of the optic axis or axes (as indicated with a dashed line with arrows on both ends). The result is that the polarized light 314 may be reoriented into light 316 with polarization in a different direction. For example, if the wave retarder 306 is a half wave plate (i.e., retardance of $\pi$) and the polarized light 314 has a polarization axis at an angle of 45 degrees (i.e., $\theta$) relative to the optic axis (i.e., the dashed lines), then the reoriented light 316 will have a new polarization axis at 90 degrees (i.e., $2\theta$) relative to the original polarization axis of light 314. Reoriented light 316 may pass through the second polarizer 304. If the polarization of the reoriented light 316 is parallel with the polarization axis of the second uniform polarizer 304, light 318 may pass through.

In order to continuously vary the amount of light transmitted, various embodiments may rely on two patterned wave retarders placed in between two uniform linear polarizers to control the variation of light transmission. A patterned wave retarder may have several domains that reorient light by varying amounts. The translation of one patterned retarder with respect to the other may change the polarization state of the light and control how much light will pass through the second polarizer.

Various different types of wave retarders may be used in embodiments. Wave retarders may be patterned to include several domains with different characteristics. When a wave retarder is placed between two crossed uniform linear polarizers (such as shown in FIG. 3) the amount of light transmitted is determined by both (1) the angle between the polarization axis of the first polarizer and the optic axis of the wave retarder and (2) the retardance. Moreover, the retardance is determined by the thickness of the birefringent material and the birefringence of the material (the difference between the refraction indices of extraordinary and ordinary rays, $n_e-n_o$). As a result, a patterned retarder can be constructed by modulating any one or more of these three parameters.

In several embodiments, the wave retarder may be patterned by varying the orientation of the optic axis in different domains of the wave retarder. For retarders that will result in a specified number of discrete transmission levels, the two patterned retarders may comprise a specified number of retarding areas or domains. These retarding areas may be of equal width on each retarder. The orientation of the optic axis of the wave retarder may differ from the orientation of the optic axis of an adjacent area by a standard angular difference (e.g., 0.1 to 30 degrees, such as 2-10 degrees). Alternately, the wave retarders may be configured to provide a smooth, continuous change in light transmission when linearly translating one retarder or panel with a retarder relative to a second retarder or panel. One panel may move while the other is stationary or both panels may move during the translation.

Figure 4A:
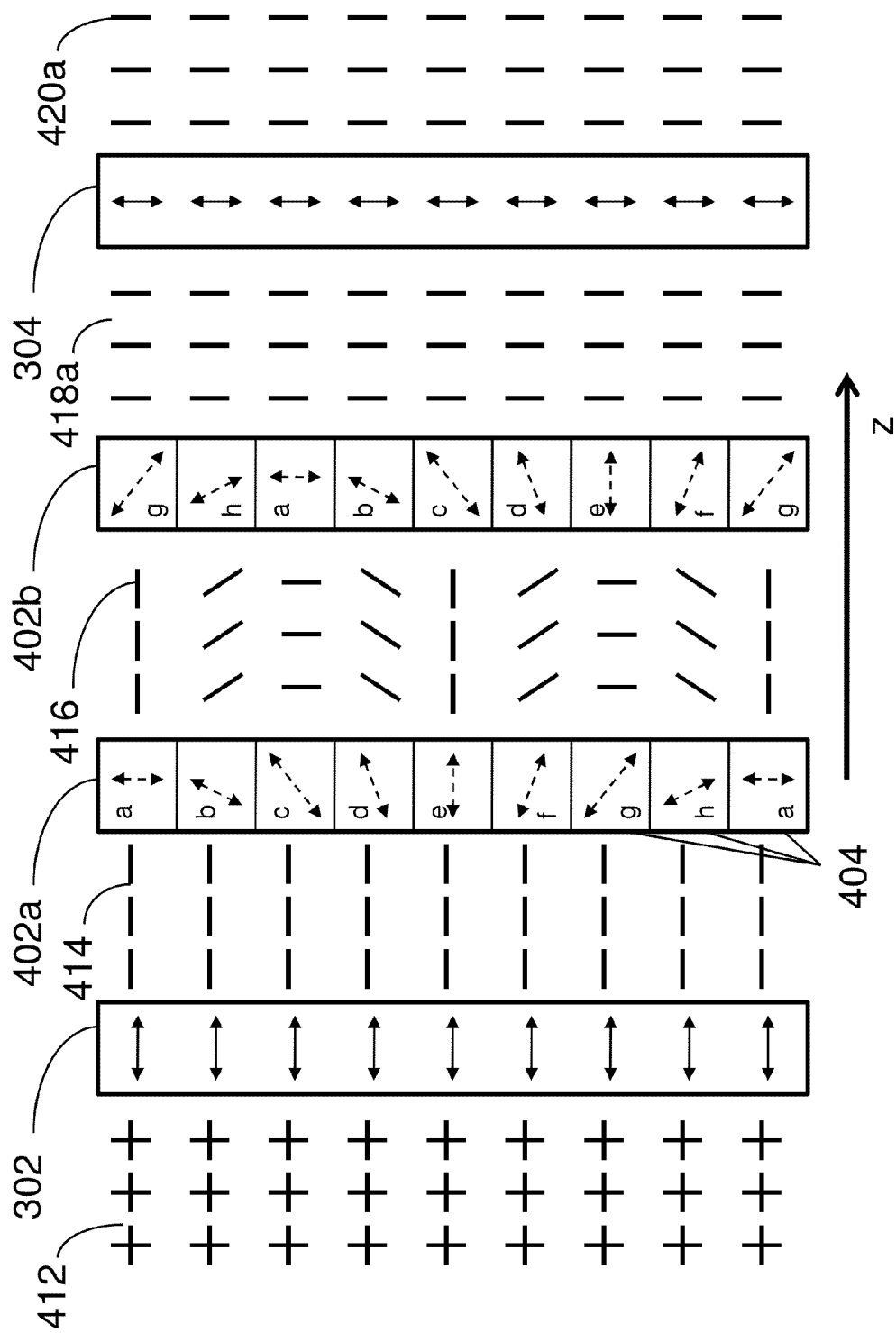

FIG. 4A illustrates an example embodiment with two patterned wave retarders 402a and 402b between two uniform crossed polarizers 302 and 304. Uncrossed polarizers may be used in alternate embodiments, but the dark and light states will be reversed. The two patterned wave retarders 402a and 402b shown in this embodiment include domains 404 a-h which vary in optic axis orientation (as shown by the variation in orientation of the dotted lines in domains 404a-h). However alternate embodiments may vary retardance by varying thickness or birefringence of domains.

Unpolarized light 412 may pass through a first uniform polarizer 302 and become polarized light 414 in the y direction. The polarized light 414 may pass through a first patterned wave retarder 402a and emerge as variably reoriented light 416. The variably reoriented light 416 may pass through a second patterned wave retarder 402b and become uniformly reoriented light 418a. The uniformly reoriented light 418a may have a common polarization parallel to the polarization axis of the second uniform polarizer 304 such that the reoriented light 418a may pass through the second uniform polarizer 304. The light 420a passing through the second polarizer 304 may be around the same intensity or less as the polarized light 414. This corresponds to the clear state of a variable optic transmission device.

Figure 4B:
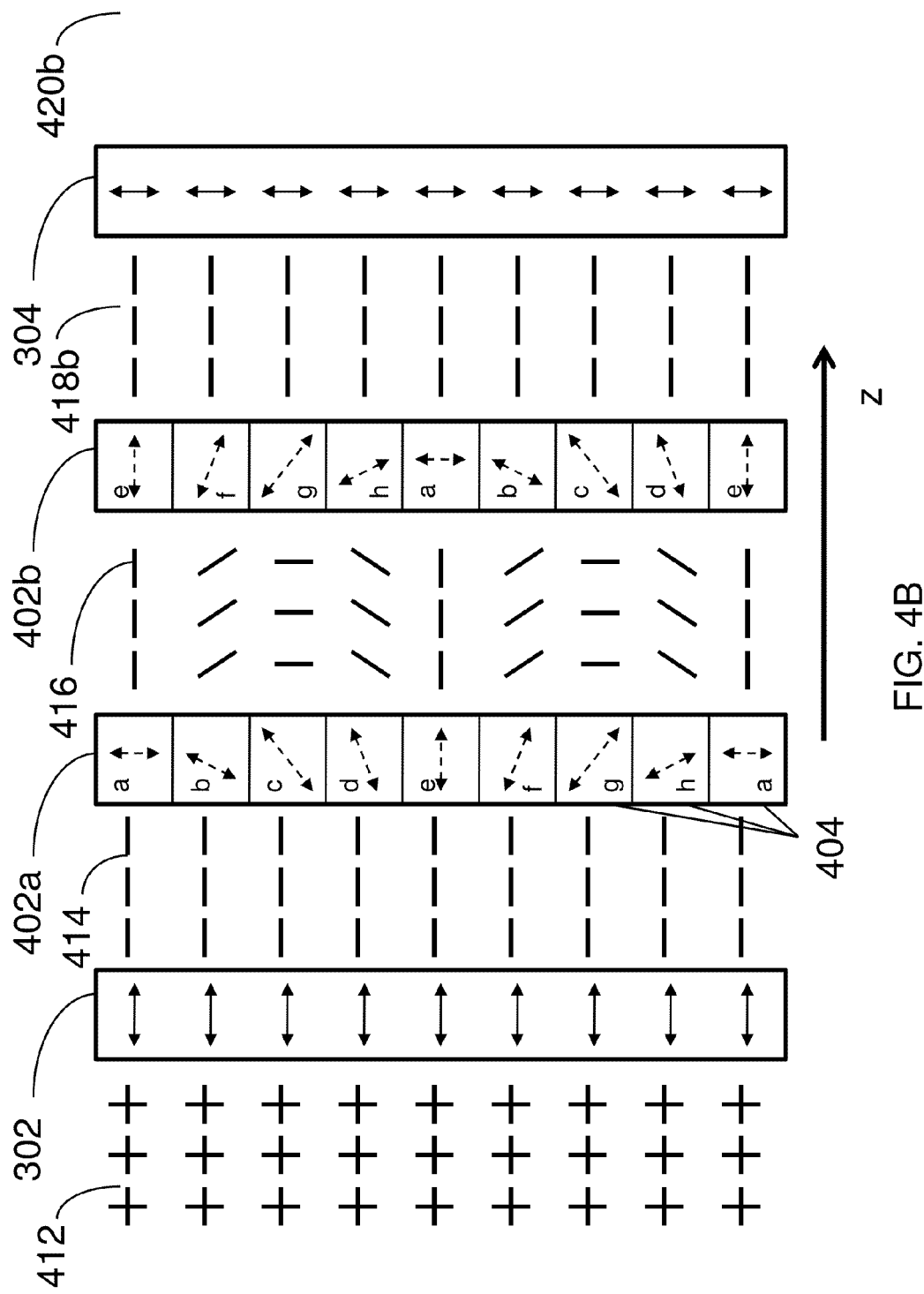

FIG. 4B illustrates an example embodiment where the second patterned wave retarder 402b is linearly translated (i.e. shifted up or down) relative to the first patterned wave retarder 402a. Similar to FIG. 4A, unpolarized light 412 may pass through the first uniform polarizer 302 and become polarized light 414. The polarized light 414 may pass through the first patterned wave retarder 402a and emerge as variably reoriented light 416. The variably reoriented light 416 may pass through a second patterned wave retarder 402b and become reoriented light 418b. However, unlike the reoriented light 418a in FIG. 4A, the reoriented light 418b after the linearly translated patterned wave retarder 402b may be polarized orthogonal to the polarization axis of the second polarizer 304, and therefore, there may be no light 420b transmitted through the embodiment. This corresponds to the dark state of a variable optic transmission device.

Figure 4C:
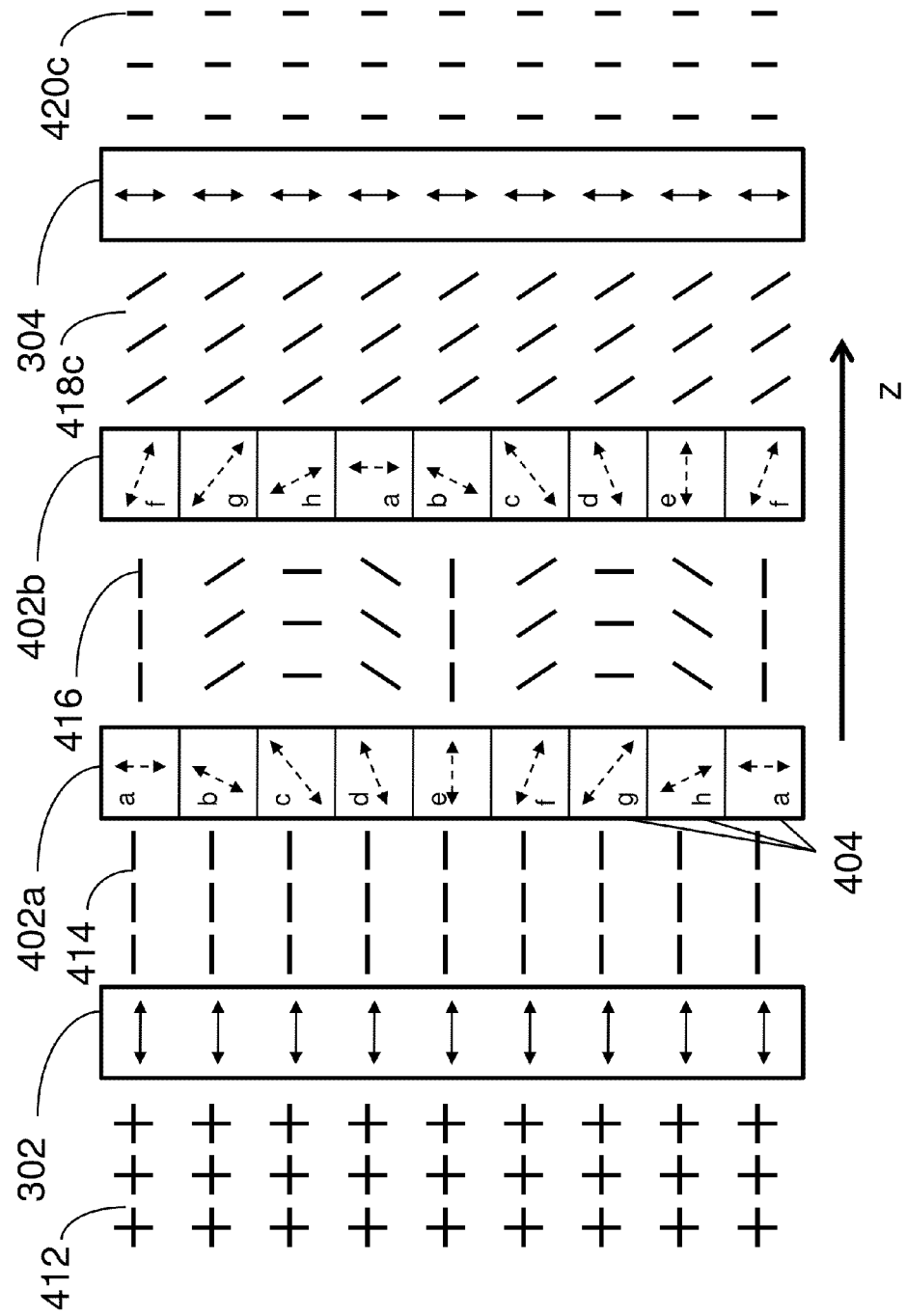

FIG. 4C illustrates another example embodiment when the second patterned wave retarder 402b is linearly translated (i.e. shifted up or down) relative to the first patterned wave retarder 402a. The second patterned wave retarder 402b may be translated half as much as the second patterned wave retarder in FIG. 4B. The result of less translation is that some of the light shines through the second polarizer. Unpolarized light 412 may pass through the first uniform polarizer 302 and become polarized light 414. The polarized light 414 may pass through the first patterned wave retarder 402a and emerge as variably reoriented light 416. The variably reoriented light 416 may pass through a second patterned wave retarder 402d and become reoriented light 418c. The polarization of reoriented light 418c may be neither parallel nor orthogonal to the polarization axis of the second uniform polarizer 304, and therefore some but not all of the light passes through 420c. This corresponds to the intermediate states of a variable optical transmission device.

Similar to the translation of patterned polarizers, the light transmitted through may be continuously varied based on the amount of relative translation between wave retarders. The patterned wave retarders may be translated relative to each other to various intermediate positions to continuously vary the intensity of light transmitted. Relative linear translation of the patterned wave retarders changes the alignment of the domains 404a-h, which changes the polarization of light 418 and changes how much light passes through the second polarizer 304.

Figure 5:
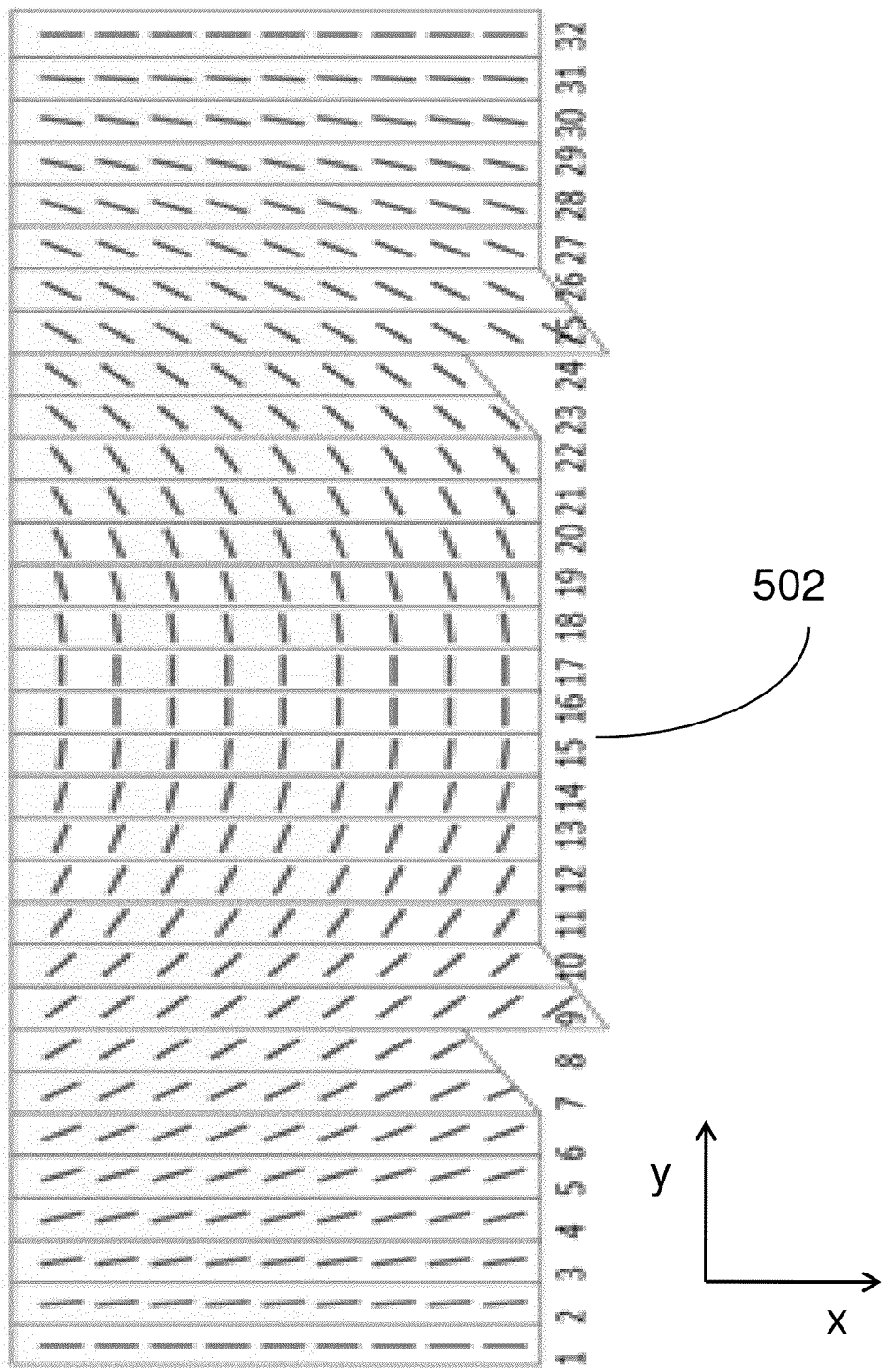
FIG. 5 is a diagram of a patterned wave plate suitable for use in various embodiments.

The patterned wave plates of further embodiments may include more domains than those shown in FIGS. 4A-4C. For example, FIG. 5 illustrates an example patterned wave plate 502 with 32 domains numbered 1-32. The patterned half wave plate 502 of FIG. 5 consists of 32 equal width domains over which the orientation of the optic axis of the retarder changes by a step size of 5.625° between adjacent domains (e.g., 180° total, as shown by the lines). Alternate embodiments may include wave plates with various other numbers of domains and angle step size.

Figure 6:
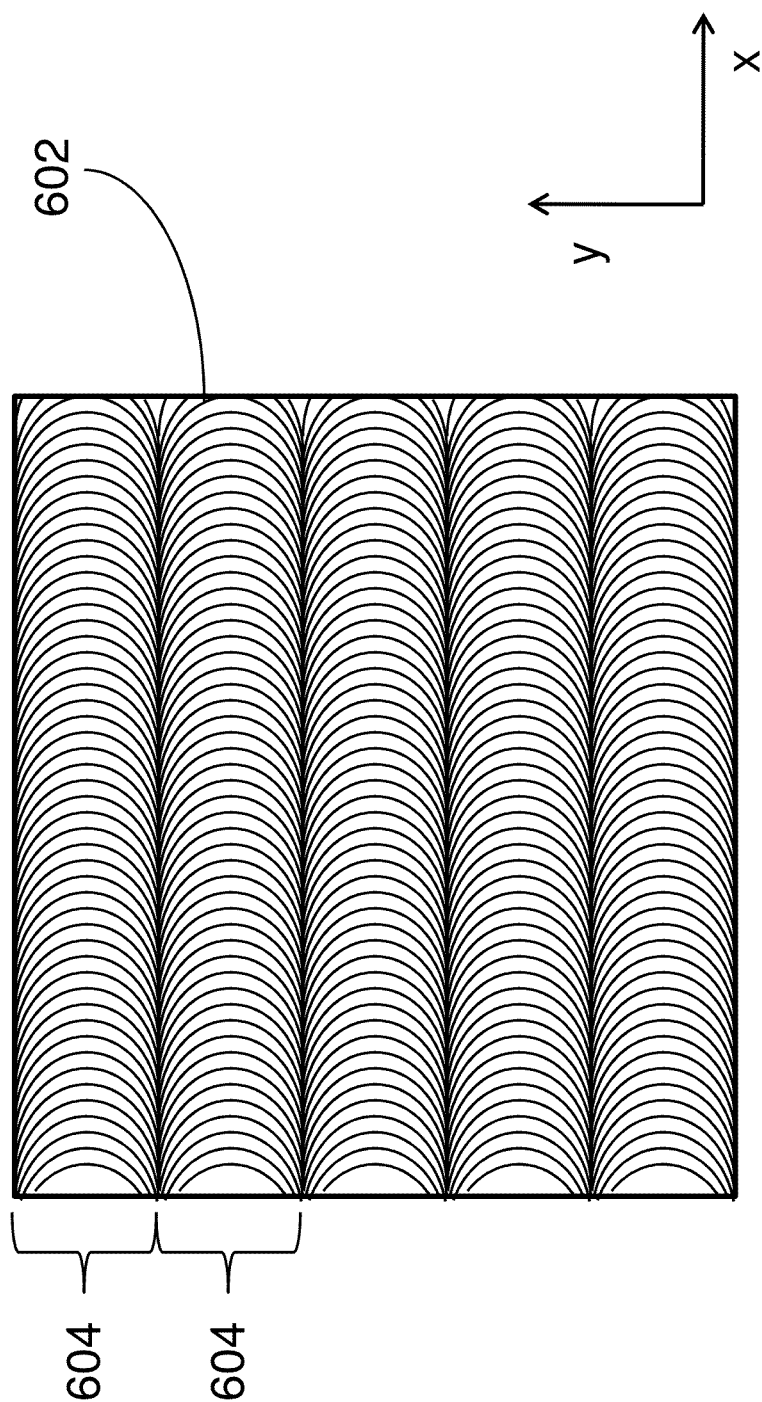
FIG. 6 is a diagram of a patterned wave plate suitable for use in various embodiments.

The patterned wave retarders of FIGS. 4A-4C and FIG. 5 illustrate that a gradually changing optic axis orientation may provide an arc or U shaped pattern across domains. This pattern may be repeated as the domains repeat. FIG. 6 illustrates an example patterned wave plate 602 with several sets 604 of the U shape pattern across many domains. Each set 604 includes the 32 domains shown in FIG. 5.

Linear translation of the patterned polarizers or wave retarders discussed above may be accomplished in various ways. Because the relative position determines the transmittance, one or both patterned polarizers or wave plates may be moved. In alternate embodiments, the patterned polarizers or wave retarders may be affixed to a sliding mechanism, such as along rails to guide the patterned polarizers or wave retarders relative to one another. Various other mechanical devices may be used to translate the patterned polarizers or wave retarders.

In some embodiments, translation of the patterned polarizers or wave retarders may be electronically controlled, such as either being controlled automatically by a computer or various logic circuits or manually by instructions from a user (e.g., a user flipping a dimming switch). FIG. 7A illustrates an embodiment variable light transmission window with such a mechanical device. Plates 706 of glass or another transparent material may be fixed within a frame 708 in a wall or other surface. Between the window plates 706, two polarizers 704 may also be fixed in the frame. Two wave plates 702a and 702b may be placed between the polarizers 704. In FIG. 7A, one wave plate 702b is fixed to the frame 708 while a second wave plate 702a is coupled with a mechanism 710 at one end. The other end of the second wave plate 702a may be movably supported by frame 708. Mechanism 710 may include various devices for linear shifted the wave plate 702a relative to the other wave plate 702b. For example, mechanism 710 may include any of various motorized, electromechanical, magnetic, or piezoelectric devices or any other device that can convert an electric signal to a linear translation.

In alternate embodiments, the patterned polarizers or wave retarders may be rolled around a rotating support at an edge to move the patterned polarizers or wave retarders up or down. These polarizers or wave retarder may be rolled up or down to linearly translate. FIG. 7B illustrates an embodiment variable light transmission window with such a rotating support. Plates 706 of glass or another transparent material may be fixed within a frame 708 in a wall or other surface. Between the window plates 706, two polarizers 704 may also be fixed in the frame. Two wave plates 702b and 702c may be placed between the polarizers 704. One wave plate 702 is fixed to the frame 708 while a second wave plate 702b is coupled at each end with rotating supports 712. These rotating supports 712 may spool a flexible wave plate 702c up or down relative to the other wave plate. The rotating supports 712 may be turned manually, (e.g., a user turning a knob) or automatically as described with regard to FIG. 7A.

Figure 7C:
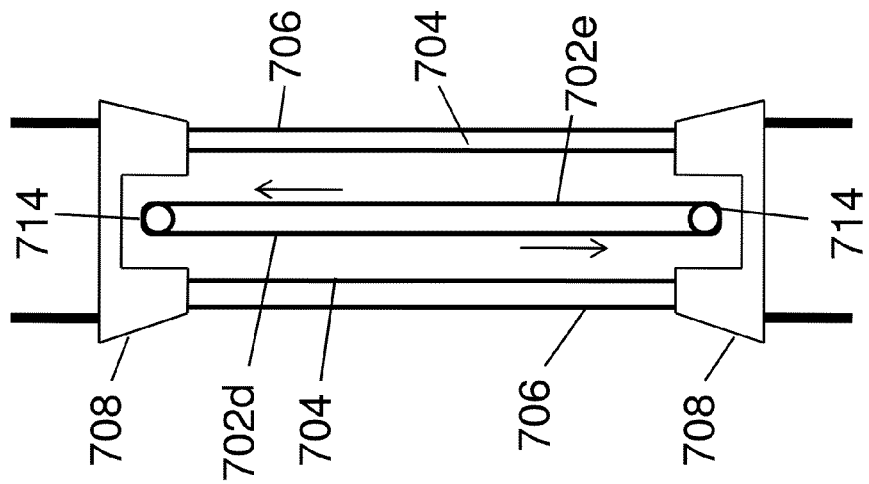
FIGS. 7A-7C are schematics of variable transmission windows with various mechanisms for linearly translating a patterned wave plate relative to another patterned wave plate.
Figure 7B:
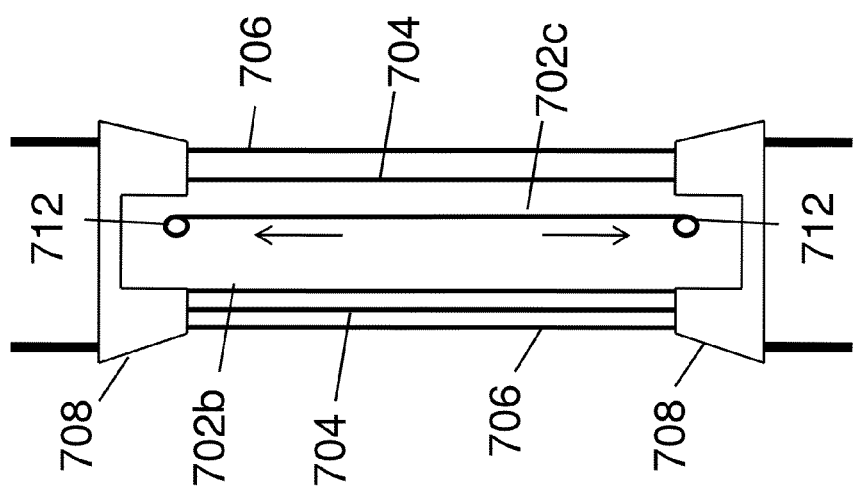
Figure 7A:
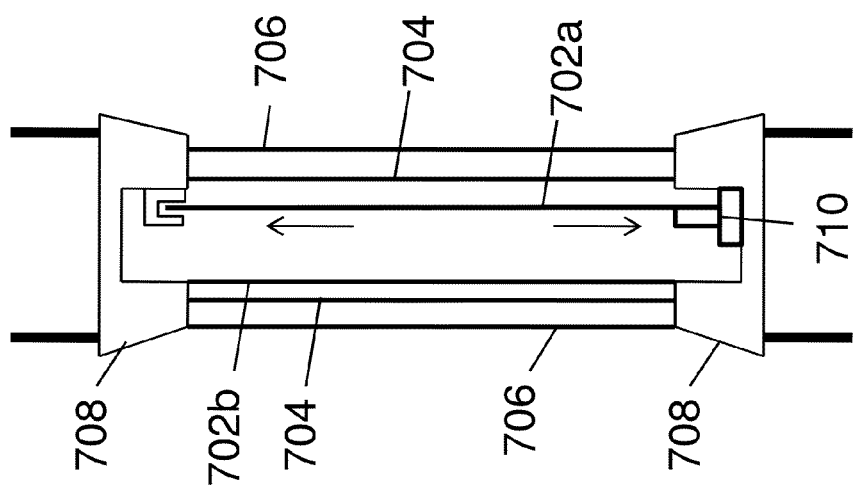

FIG. 7C shows an alternate embodiment in which both wave plates 702d and 702e are simultaneously moved by rotating devices 714. The wave plates 702d and 702e may be part of one continuous wave plate film or web which is mounted around the rotating spools or reels 714. These rotating devices 714 may also be rotated manually or automatically as described above.

FIGS. 7D and 7E illustrate a linear translation of a first patterned wave retarder 702a with respect to a second patterned wave retarder 702b. The waver retarders 702a and 702b may be in between two crossed uniform polarizers 704. FIG. 7D illustrates a translated retarder 702a allowing light to be transmitted. As shown, the waver retarder 702a may be linearly translated (e.g., vertically as shown in FIG. 7D) by a desired amount which depends on the size of the domains with respect to the other wave retarder 702b. For example, the translation distance may be 5 to 50 mm, such as 13 mm shown in the figure, but this distance may vary depending on the width and number of the domains. FIG. 7E shows the retarder 702a linearly translated back (e.g., down vertically) and preventing light from being transmitted through the device. While vertical linear translation is shown, it should be noted that the linear translation may be in a horizontal direction or any other direction between vertical and horizontal with respect to the ground based on the positioning of the components of the device.

The embodiments shown in the figures include gaps between polarizers and wave retarders, but this could be avoided in some embodiments. For example, wave retarders may be laminated or affixed to polarizers. Some embodiments may include panels which may contain a polarizer and/or a wave plate. These panels may be translated relative to one another. In further embodiments, polarizers or panels may remain stationary while one or more wave retarders between the polarizers or panels are linearly translated.

Various embodiments may include patterned wave retarders or polarizers produced by any of several different methods. In one method of production, stretched polymer retardance film may be cut in various size strips at different orientations to create multiple strips of rotating axis retardance filter which can be laminated to substrates (or polarizers) to create a patterned retardance film.

Figure 8B:
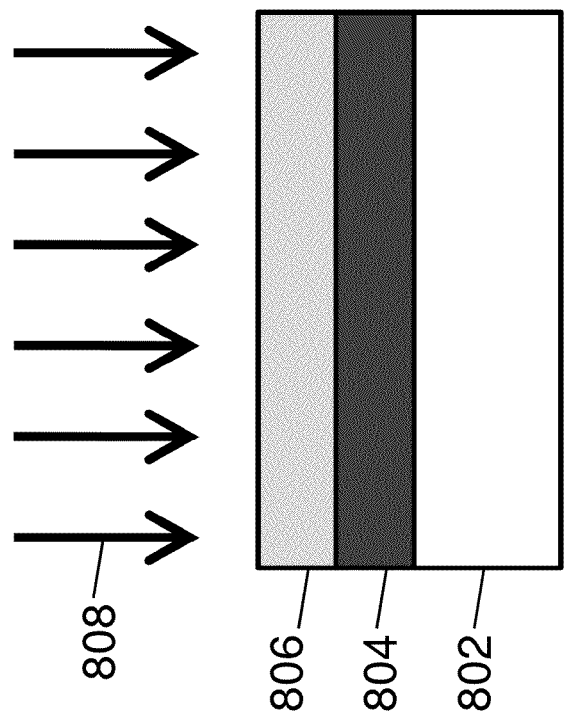
FIG. 8B illustrates a liquid crystal polymer layer assuming the optic axis variations of the alignment layer under blanket exposure to ultraviolet radiation.
Figure 8A:
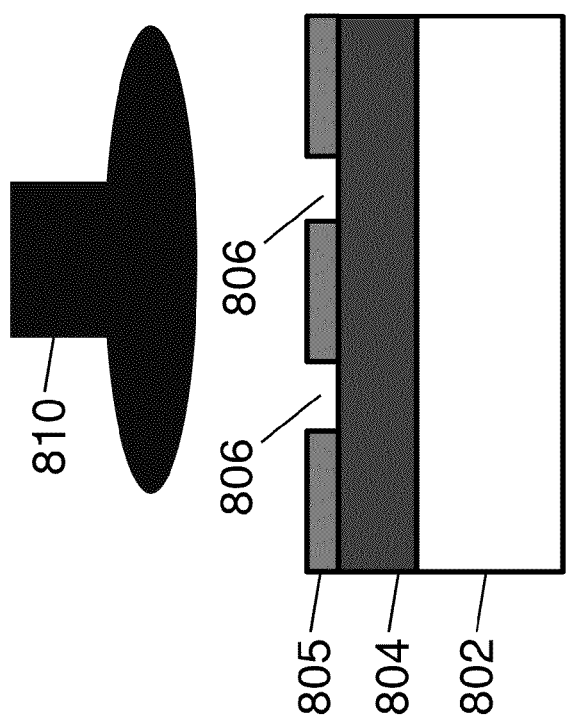
FIG. 8A illustrates an alignment layer being rubbed.

In another method of production, the change in the orientation of the optic axis of the retarder may be achieved through mechanical rubbing of alignment layers. As shown in FIG. 8A, a conventional alignment layer 804 may be deposited on a substrate 802. A mask 805 may be placed on the alignment layer and then rubbed with a buffing wheel 810 to induce a particular alignment in the portions of the layer 804 exposed through openings 806 in the mask 805. The sample may then be rubbed in a different direction using a different mask. This method may also be performed without the use of a mask. After the mask 805 is removed, a liquid crystal polymer 806 may be deposited on the surface of the layer 804 and blanket exposed to radiation (e.g., ultraviolet radiation) 808 to create a patterned retarder in layer 806 following the rubbing patterns in layer 804 as shown in FIG. 8B. The liquid crystal polymer 806 adopts the orientation rubbed into the alignment layer 806 and becomes a patterned wave (i.e., retarder) plate.

In another method of production, the change in orientation of the optic axis of the retarder may be achieved through photopatterned surface alignment of liquid crystal polymers. Alignment layers provide a well-defined orientation of liquid crystal (LC) molecules in contact with the aligning surface. A photoaligned layer is oriented solely by light exposure, i.e. without any mechanical contact and consequently enables an arbitrary orientation to be transferred to the LC molecules. Exposing a substrate coated with specialized photo-reactive polymers (azo-dyes, Rolic Research Linear Photopolymers) to linearly polarized UV light (LPUV) induces preferential alignment direction in the direction of polarization and subsequent alignment of LC molecules coming in contact with the photoreactive alignment layer. A spatial variation in alignment direction can be induced by area-selectively exposing the alignment layer to differently conditioned LPUV light i.e. with varying intensities, incidence angles, or polarization directions. In a second step, the anisotropic LPP layer is coated with a formulation of the liquid crystal polymer (LCP) containing also a photoinitiator. After aligning the LCP by the subjacent LPP layer, the film is crosslinked with upolarized UV light, providing a permanently oriented patterned retarder.

There are different ways to generate alignment patterns in LPP layers. Among them are the use of photomasks, alignment masters, laser scanning and synchronized rotation and/or movement of the UV-polarizer and substrate during UV-exposure. One option for creating the required complex alignment pattern in a single exposure step is the use of an alignment master. The function of an alignment master is to provide LPUV light with a spatial variation of the polarization plane, which directly generates an alignment pattern when it hits the LPP layer.

Figure 8C:
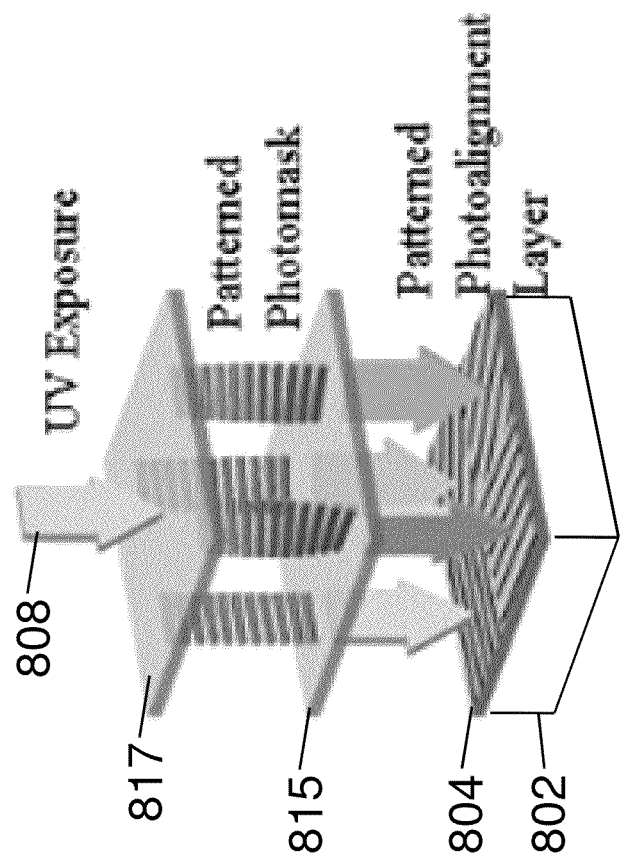
FIG. 8C illustrates exposure of an alignment layer under a patterned photomask.

An example of an alignment layer being prepared with UV light through a photomask is shown in FIG. 8C. The alignment layer 804 may be deposited on a substrate 802. UV radiation 808 may pass through a polarizer 817 to become polarized UV radiation. The resulting polarized UV radiation may then pass through a patterned photomask 815 to selectively expose portions of the alignment layer 804. This creates patterns in the exposed alignment layer 804. This process may be repeated by moving the photomask 815 with respect to the alignment layer 804 and/or exposing the alignment layer 804 through plural photomasks 815 to pattern the whole alignment layer 804. A liquid crystal polymer layer is then deposited on the patterned alignment layer 804 and blanket exposed to polymerize the liquid crystal polymer layer. The liquid crystal polymer layer adopts the orientation patterned into the alignment layer 806 and becomes a patterned wave (i.e., retarder) plate (similar to process shown in FIG. 8B).

In another method of production, the change in orientation of the optic axis of the retarder is achieved through liquid crystal polymer patterning on a grating structure. Patterned retarders may also be created using grating-like sawtooth surfaces patterned on substrates. These grating structures are created by depositing photoresist on a flat substrate and exposing through an amplitude photomask. Rather than normal shadow photomasks, amplitude photomasks are gradients of transmission yielding smooth features as opposed to discrete regions. Exposing photoresist through an amplitude mask and developing creates a sawtooth pattern on the substrate. Coating a liquid crystal polymer on this substrate creates alternating liquid crystal polymer alignment and thus alternating retardance values according to the position on the sawtooth.

In another method of production, the change in orientation of the optic axis of the retarder is achieved through printable self-assembling organics/lyotropic liquid crystals. Organic molecules exhibiting self-assembly behavior exhibit birefringent properties necessary in retarders. These self-assembling fluids can be coated or printed onto substrates to form a retardance filter cheaper than a stretched polymer retardance film. Alignment of the long axis of the oblong (anisotropic) molecules is determined by the pressure induced through a slot-die printing process. Different orientations of the optic axis of the retarder can be achieved by varying the direction of shear force.

In various embodiments, the wave retarder may be patterned by changing the thickness of the birefringent material. For a film that will result in a specified number of discrete transmission levels the two patterned retarders will comprise a specified number of retarding areas of equal width. The thickness of the wave retarder differs from the thickness of an adjacent area by a standard discrete amount. It is also possible to produce a film that will result in a smooth, continuous change in light transmission when linearly translating one panel with respect to a second panel. The variable retarders patterned by changing the thickness of the birefringent material may be produced by the following methods or by similar methods.

In one method of production, the variation in retardance is achieved through thickness patterning of liquid crystal polymer retardance layers. A liquid crystal polymer is wet coated on a substrate with uniform alignment layer coated on the substrate. A UV photomask exposure is used to photopolymerize specific regions into a planar alignment. The substrate is then treated with tetrahydrofuran (or other developer chemical) to dissolve liquid crystal polymer that has not been crosslinked and polymerized. This results in regions with no retardance and regions of retardance dependent on liquid crystal polymer birefringence and layer thickness.

In another method of production, the wave retarder is patterned by changing the thickness of the birefringent material through replicate mold liquid crystal polymer printing.

PDMS (polydimethylsiloxane) polymer mold stamps can be created using a master photolithographically produced polymer mold and subsequently used to stamp patterns in polymeric liquid crystals. The liquid crystal polymer is cured with the stamp imprinted into the material leaving a residual patterned liquid crystal retarder. Alignment is generated through the interaction of liquid crystal polymer with treated imprinting PDMS surface such that additional alignment layers are not necessary.

In another method of production, the wave retarder is patterned by changing the thickness of the birefringent material through coating the material on a substrate with varying surface height. To vary the surface height, a micro-embossing method is suggested. This method consists of a micro patterned stamp and moldable non-birefringent transparent substrate such as polyethylene (PET) polyvinyl alcohol (PVA) or polyimide. This patterned substrate is then peeled from the mold and coated with a printable polymer liquid crystal or other birefringent material.

An example mold for the previous methods is shown in FIG. 9. A stamp or substrate 902 may vary in height in various shapes. The substrate 902 in FIG. 9 illustrates an example sawtooth shape. Liquid crystal polymer 904 may be layered on top of the mold 902 to assume varying thickness and retardance.

In several embodiments the wave retarder is patterned by changing the birefringence. For a film that will result in a specified number of discrete transmission levels the two patterned retarders will comprise a specified number of retarding areas of equal width. The birefringence of the wave retarder differs from the birefringence of an adjacent area by a standard discrete amount. It is also possible to produce a film that will result in a smooth, continuous change in light transmission when linearly translating one panel with respect to a second panel. The variable retarders patterned by changing the birefringence may be produced by the following methods or by similar methods.

In one method of production the wave retarder is patterned by changing the birefringence through thermal patterning of liquid crystal polymers. Patterned retarders can be created using liquid crystal polymers and a substrate coated with standard uniform alignment layer. A liquid crystal acrylate is wet coated onto the substrate and orients in the planar configuration along the alignment layer. A photomask is created and the liquid crystal polymer is exposed to UV light to crosslink and fix the planar alignment in selected regions. The photomask is removed and the sample is heated above the liquid crystal polymer clearing point (creating an isotropic or random alignment condition). The sample is then blanket exposed to fix the random alignment in regions not previously polymerized in the linear condition. Both exposures are performed in a nitrogen environment to minimize polymerization in absence of UV exposure and cross polymerization outside of photomask boundaries.

In another method of production, the wave retarder is patterned by changing the birefringence through photopatterning of liquid crystal polymer and photoreactive isomers. Rather than removing liquid crystal alignment by increasing temperature to the isotropic as in the above method, mixtures of liquid crystal polymer and photoreactive isomers can be used to modify the isotropic temperature through exposure. The configuration is similar in that a liquid crystal polymer is coated on a substrate with a linear alignment layer already deposited. The liquid crystal polymer mixture is then exposed through a photomask, but instead of polymerizing the liquid crystal polymer in these regions, it changes the isotropic temperature through an isomerization of one component of the liquid crystal polymer mixture. The system is designed such that, on UV exposure, the isotropic transition temperature decreases below room temperature. As a result, regions exposed in the first exposure step have an isotropic alignment while regions not exposed remain in the linear configuration. A second blanket exposure is then performed to solidify the film.

In another method of production, the wave retarder is patterned by changing the birefringence through mixing photoreactive alignment layers (e.g., Rolic LPP) directly into the liquid crystal polymer mixtures (as opposed to coating on the surface and patterning before applying the liquid crystal polymer). In this technique, the alignment of the liquid crystal polymer is controlled throughout the volume of the liquid crystal polymer mixture and not just at the surface. This mixture is applied to a substrate with uniform planar alignment layer. The sample is UV photomask exposed in one region with one UV polarization and another region with a different polarization. The different polarization exposures create a helical or twisted liquid crystal polymer structure with different chirality (lefthanded, right-handed), which in turn causes different amounts of retardance.

In another method of production, the wave retarder is patterned by changing the birefringence through photoaligned cholesteric liquid crystals. Cholesteric liquid crystals (CLC's) have a helical or twisted structure similar to that of DNA. Certain CLC's can be engineered such that the amount of chirality (or helical twisting power) can be modulated through UV light exposure dose, e.g., long exposure to UV can modulate the twist and thus the retardance of a CLC. Patterned retardance layers may be formed through exposure of different domains of CLC to different dosage amounts of UV light through multiple photomasks.

In another method of production, the wave retarder is patterned by changing the birefringence through laser printing polymer stretched retarders. Birefringence is introduced into polymer films through stretching of the polymer inducing shape anisotropy and thus birefringence/retardance. Heating or chemical treatment of these polymer films can break stressed polymeric bonds, creating a random alignment of monomers in a localized area. This can be utilized to created patterned retardance films through a laser printing process provided that the laser is well controlled to deliver an appropriate dosage. A laser is scanned across the sample and removes the retardance in printed stripes through local heating.

In another method of production, the wave retarder is patterned by changing the birefringence through coating strips of different liquid crystal materials with varying birefringence. In this method a slot die coater would deposit different liquid crystal materials in different areas across the substrate.

It is also possible that a combination of any of the above specified methods or similar methods may be used to create the patterned retarders.

Figure 10:
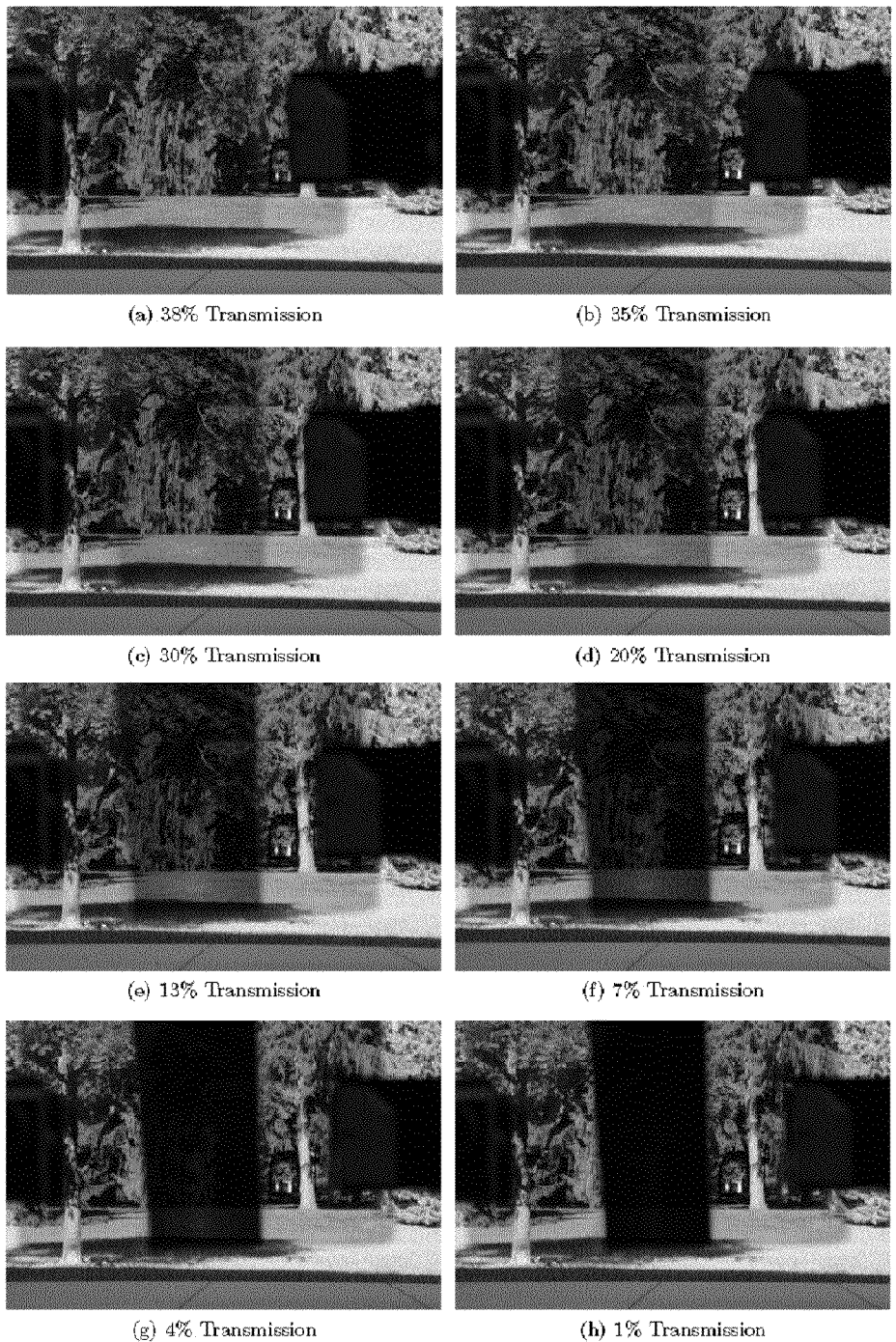
FIG. 10 is a series of photographs showing varying degrees of light transmission in an exemplary embodiment.

FIG. 10 is a series of digital images demonstrating an exemplary embodiment of light passing through the variable transmission device of the embodiments of the invention. Images (a)-(h) show the variation of light transmission as wave retarders are linearly translated with respect to one another. Each image contains a central portion where variable transmission device is located. Image (a) shows a 38% transmission of light through the center portion with objects clearly visible in the background. The central portion in each image gets progressively darker (i.e., 35%, 30%, 20%, 13%, 7%, 4% transmission in the center of images (b) through (g), respectively), until image (h) shows a 1% light transmission through the center portion.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A variable transmission device, comprising:
   a first uniform polarizer with a first polarization axis;
   a second uniform polarizer with a second polarization axis;
   a first patterned wave retarder positioned between the first and second polarizers and comprising a first plurality of domains configured to vary in at least one of optic axis, thickness, or birefringence; and
   a second patterned wave retarder positioned between the first and second polarizers and comprising a second plurality of domains configured to vary in at least one of optic axis, thickness, or birefringence,
   wherein the first or second wave retarder is configured to be linearly translatable relative to the other one of the first or second wave retarder.

2. The variable transmission device of claim 1, wherein the first and second plurality of domains are configured to vary in optic axis.

3. The variable transmission device of claim 2, wherein the first and second wave retarders comprise patterned liquid crystal polymer.

4. The variable transmission device of claim 2, wherein the first and second wave retarders comprise stretched polymer films.

5. The variable transmission device of claim 2, wherein the first and second wave retarders comprise printed self-assembling liquid crystals.

6. The variable transmission device of claim 1, wherein the first and second plurality of domains comprise half-wave plates or quarter-wave plates.

7. The variable transmission device of claim 1, wherein the first and second wave retarders comprise patterned liquid crystal polymer or molded liquid crystal polymer configured to vary in thickness.

8. The variable transmission device of claim 1, wherein the first and second plurality of domains
   are configured to vary in retardance.

9. The variable transmission device of claim 1, wherein the first and second wave retarders comprise thermally treated liquid crystal polymer, helical liquid crystal polymer, twisted liquid crystal polymer, or cholesteric liquid crystals.

10. The variable transmission device of claim 1, wherein the first polarization axis and second polarization axis are parallel.

11. The variable transmission device of claim 1, wherein the first polarization axis and second polarization axis are not parallel.

12. The variable transmission device of claim 1, wherein the first and second polarizers are one of iodine doped polarizers, wire grid polarizers, coatable polarizers, or reflective polarizers.

13. The variable transmission device of claim 1, wherein the first patterned wave retarder is connected to the first uniform polarizer in a first panel and the second patterned wave retarder is configured to linearly translate with respect to the first patterned wave retarder.

14. The variable transmission device of claim 1, wherein the first patterned wave retarder is connected to the first uniform polarizer in a first panel, the second patterned wave retarder is connected to the second uniform polarizer in a second panel, and the first panel is configured to linearly translate with respect to the second panel.

15. The variable transmission device of claim 1, wherein the first patterned wave retarder is connected to a rotating support.

16. The variable transmission device of claim 1, wherein the device is located between first and second window plates set into a wall.

17. A method of operating the device of claim 1, the method comprising:
   moving the first patterned wave retarder with respect to the second patterned wave retarder such that less light is transmitted through the variable optical transmission device; and
   moving the first patterned wave retarder with respect to the second patterned wave retarder such that more light is transmitted through the variable optical transmission device.

18. A variable transmission device, comprising:
   a first polarizer; and
   a second polarizer;
   a first patterned wave retarder positioned between the first and second polarizers and comprising a first plurality of domains configured to vary in orientation of optic axis; and
   a second patterned wave retarder positioned between the first and second polarizers and comprising a second plurality of domains configured to vary in orientation of optic axis,
   wherein the first or second wave retarder is configured to be linearly translatable relative to the other one of the first or second wave retarder.

19. The variable transmission device of claim 18, wherein:
   the first polarizer is a uniform linear with a first polarization axis;
   the second polarizer is a uniform linear with a second polarization axis;
   the first polarization axis and the second polarization axis are not parallel; and
   the device is located between first and second window plates set into a wall.

* * * * *